United States Patent [19]

Masuda

[11] Patent Number: 4,973,155
[45] Date of Patent: Nov. 27, 1990

[54] METHOD OF AIMING ADJUSTMENT FOR HEADLIGHTS OF AUTOMOTIVE VEHICLES

[75] Inventor: Yoshihiro Masuda, Hiroshima, Japan

[73] Assignee: Mazda Motor Corporation, Hiroshima, Japan

[21] Appl. No.: 385,880

[22] Filed: Jul. 27, 1989

[30] Foreign Application Priority Data

Jul. 29, 1988 [JP] Japan .................................. 63-190779

[51] Int. Cl.⁵ ........................ G01J 1/00; G01C 15/00; B60Q 1/10
[52] U.S. Cl. .................................... 356/121; 356/155; 33/286; 362/71
[58] Field of Search ............................... 356/121–123, 356/155, 399–401; 331/286, 288; 362/67, 71

[56] References Cited

U.S. PATENT DOCUMENTS

| | | | |
|---|---|---|---|
| 2,552,116 | 5/1951 | Rodegliero | 33/288 |
| 3,746,449 | 7/1973 | Schick | 356/121 |
| 4,647,195 | 3/1987 | Ishikawa et al. | 356/121 |
| 4,730,923 | 3/1988 | Kosugi et al. | 356/121 |
| 4,802,067 | 1/1989 | Ryder et al. | 33/288 |

FOREIGN PATENT DOCUMENTS

| | | |
|---|---|---|
| 56-64841 | 4/1981 | Japan . |
| 57-1234496 | 7/1982 | Japan . |
| 58-130627 | 7/1983 | Japan . |
| 61-146615 | 6/1986 | Japan . |

*Primary Examiner*—Richard A. Rosenberger
*Assistant Examiner*—Hoa Q. Pham
*Attorney, Agent, or Firm*—Wegner & Bretschneider

[57] ABSTRACT

A method of aiming adjustment for headlight of automotive vehicles, which is joined with a turning test of wheels for obtaining relationship between steering wheel angles and wheel turning angles, includes steps of: detecting step for detecting side edge of a headlight or a front combination lamp while a tested vehicle is placed on a turning test station, calculating step for calculating an aberration or inclination of a tested vehicle with respect to a headlight aiming testing line in a horizontal plane, and correcting step for correcting coordinates of the aiming test according to said aberration or inclination.

9 Claims, 8 Drawing Sheets

METHOD OF AIMING ADJUSTMENT FOR HEADLIGHTS OF AUTOMOTIVE VEHICLES

FIELD OF THE INVENTION

This invention relates to a method of aiming adjustment for headlights of automotive vehicles. particularly to a method of aiming adjustment combined with a turning test for the wheels on the same test station.

BACKGROUND OF THE INVENTION

In a tester line of automobile assembly plants, an aiming adjusting step for headlights and a testing step for detecting the ratio of steering angle to wheel turning angle have not previously been performed at the same work station.

The aiming adjustment for headlights is performed by utilizing a screen. An automobile to be tested is conveyed in front of a screen and stopped to adjust the aiming of the headlights. The beam direction of the headlights is adjusted so that the brightest point on the screen or the borderline between brightness and darkness on the screen appear within a predetermined allowable area.

On the other hand, the turning test is performed by utilizing a turning radius tester. After placing the right and left steerable wheels on the turning radius tester, the vehicle body is kept stationary on a horizontal plane, while the relationship between angles of a steering wheel and turning angle of the wheel is detected by turning the steering wheel gradually.

However, from the viewpoint of testing efficiency, it is desirable to perform these two tests consecutively on the same testing station. But, if these two tests are done on a turning test station and the front wheels are not placed precisely on the predetermined position, the aiming test cannot be performed accurately because the turning radius tester does not have an equalizer for the front wheels. Therefore, the aiming test cannot be performed accurately even if the aiming test is performed before the turning test on the wheels.

Also, if the turning test is done before the aiming test, the turning test causes tiny movements of the vehicle body in the horizontal plane during turning of the wheels. Because of this tiny movement, the vehicle body having finished the wheel turning test is not accurately set for the headlight aiming test. Accordingly, it has been difficult to perform these two tests consecutively on the same testing station.

SUMMARY OF THE INVENTION

To solve the above-mentioned problem, it is a purpose of the present invention to provide a method for performing an accurate headlight aiming adjustment combined with a wheel turning test at the same testing station.

The present invention is achieved by detecting the side edge of a headlight or a front combination lamp and calculating an aberration or inclination in the tested vehicle with respect to a light aiming testing line in a horizontal plane, then correcting the coordinates of the aiming test.

DETAILED DESCRIPTION OF THE INVENTION

Figure 2:
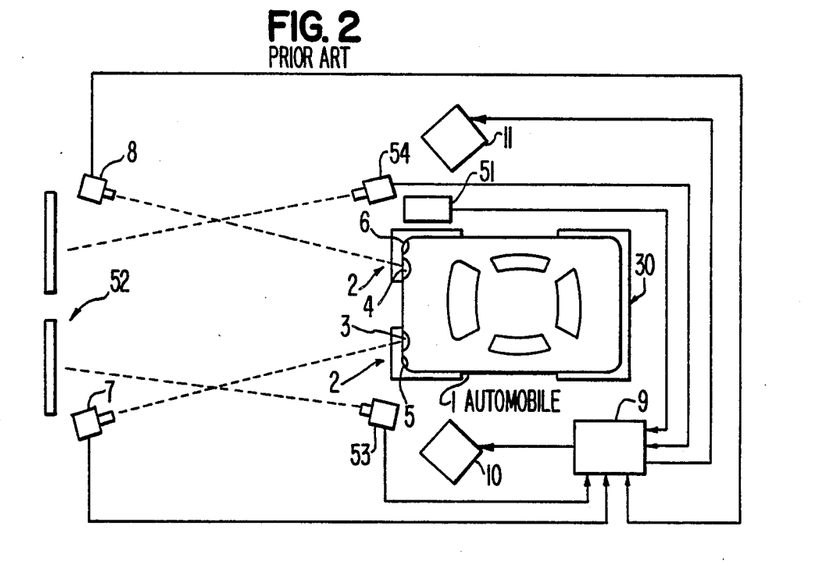
FIG. 2 is a schematic view of the test station for performing this invention.
Figure 3:
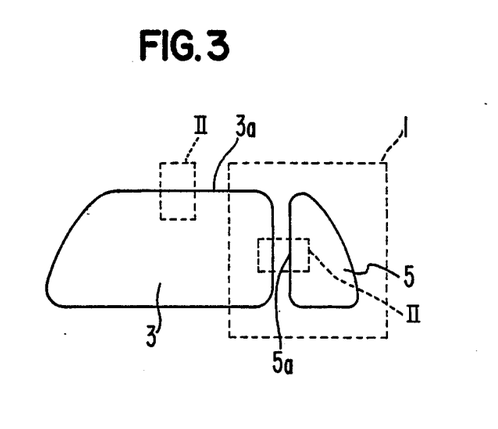
FIG. 3 is a front view of a headlight and a combination lamp for illustrating a window setting in the headlight aiming test.

Referring to FIG. 2, steerable wheels of a vehicle 1 which is to be tested are placed on the turning radius tester 2, which is locked. Before the aiming adjustment of the headlights is done, both positions of an upper edge 3a of a left headlight 3 and an inside edge 5a of a left combination lamp 5 are detected by a first left TV camera 7, and both positions of an upper edge 4a of a right headlight 4 and an inside edge 6a of a right combination lamp 6 are detected by a first right TV camera 8, as shown in FIG. 3.

Signals detected by the TV cameras 7 and 8 are input into an image processing unit 9. The image processing unit 9 has a micro computer and performs image processing for a headlight aiming adjustment according to a stored program which is described in detail hereinafter. First an aberration or inclination of the vehicle 1 with respect to an aiming test line in a horizontal plane is detected according to the signals detected by the TV cameras 7 and 8. Then, aiming standard coordinates are calculated by correcting a predetermined borderline discriminating a bright area and a dark area on a screen 52 according to the aberration or inclination.

The aiming standard coordinates are displayed on monitors 10 and 11 and are watched by workers at a station to visually check the aiming adjustment. Accordingly, workers do not need to reset the vehicle. Furthermore, these aiming standard coordinates are renewed for each vehicle body, which enables workers to do their jobs efficiently without modifying vehicle positions.

Figure 5:
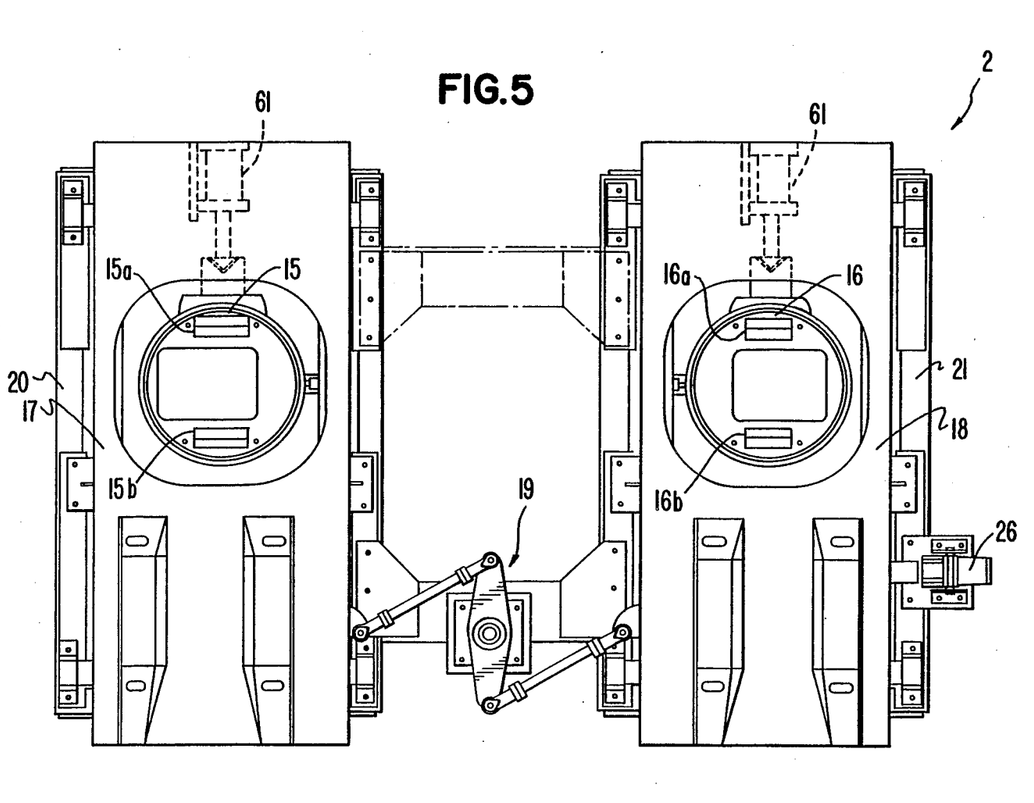
FIG. 5 is a plan view of a turning radius tester.
Figure 5A:
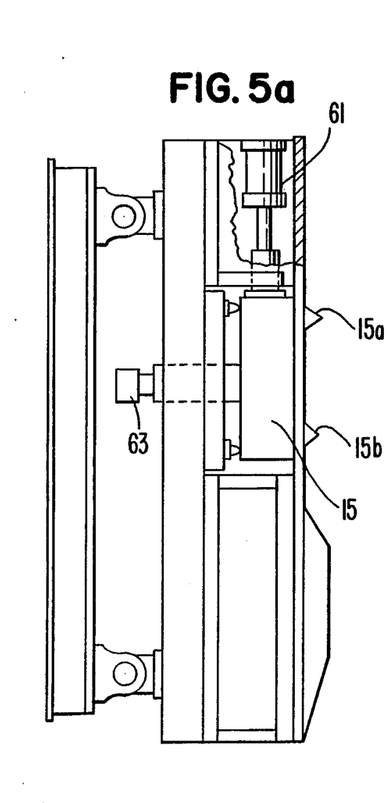
FIG. 5a is a side view of the turning radius tester of FIG. 5.
Figure 6:
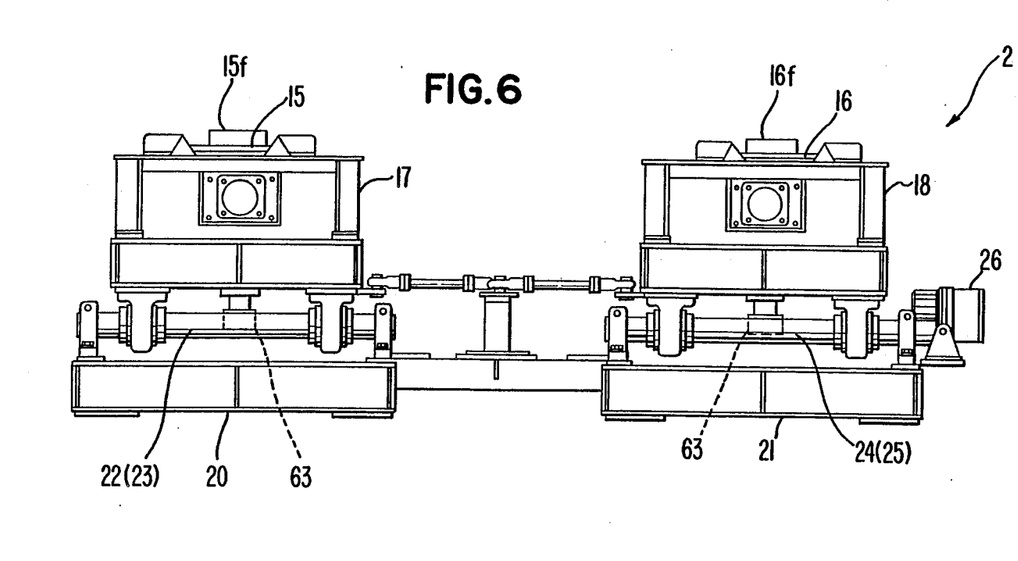
FIG. 6 is a front view of the turning radius tester.

Referring now to FIGS. 5 and 6, the turning radius tester 2 is explained in detail. A pair of turning tables 15 and 16 for placing left and right front wheels are supported rotatably about their vertical axis by left and right movable frames 17 and 18, respectively. The turning tables 15 and 16 have a pair of wheel stoppers 15a, 15b, and 16a, 16b, respectively. The movable frames 17 and 18 are mutually connected by a link mechanism 19, which includes a lock mechanism. The movable frame 17 for the left front wheel is guided and supported slidably on a pair of guide rods 22 and 23, which are disposed parallel in a transverse direction and fixed on a stationary frame 20. The movable frame 18 for the right front wheel is guided and supported slidably on a pair of guide rods 24 and 25, which are disposed parallel in a transverse direction and fixed on a stationary frame 21.

Between the movable frame 18 and the stationary frame 21, a power cylinder 26 is provided to change a mutual distance of the turning tables 15 and 16 in accordance with a wheel base of each vehicle. By actuating the power cylinder 26, the movable frame 18 can be moved in the transverse direction. At the same time, the movable frame 17 can be moved symmetrically by the link mechanism 19. After adjusting the distance, the link mechanism 19 is locked by the lock mechanism.

The turning tables 15 and 16 have encoders 63 on their support shafts, which detect the actual turning angles of the left and right front wheels. Numeral 61 denotes a lock cylinder to lock the turn tables 15 and 16.

Figure 7:
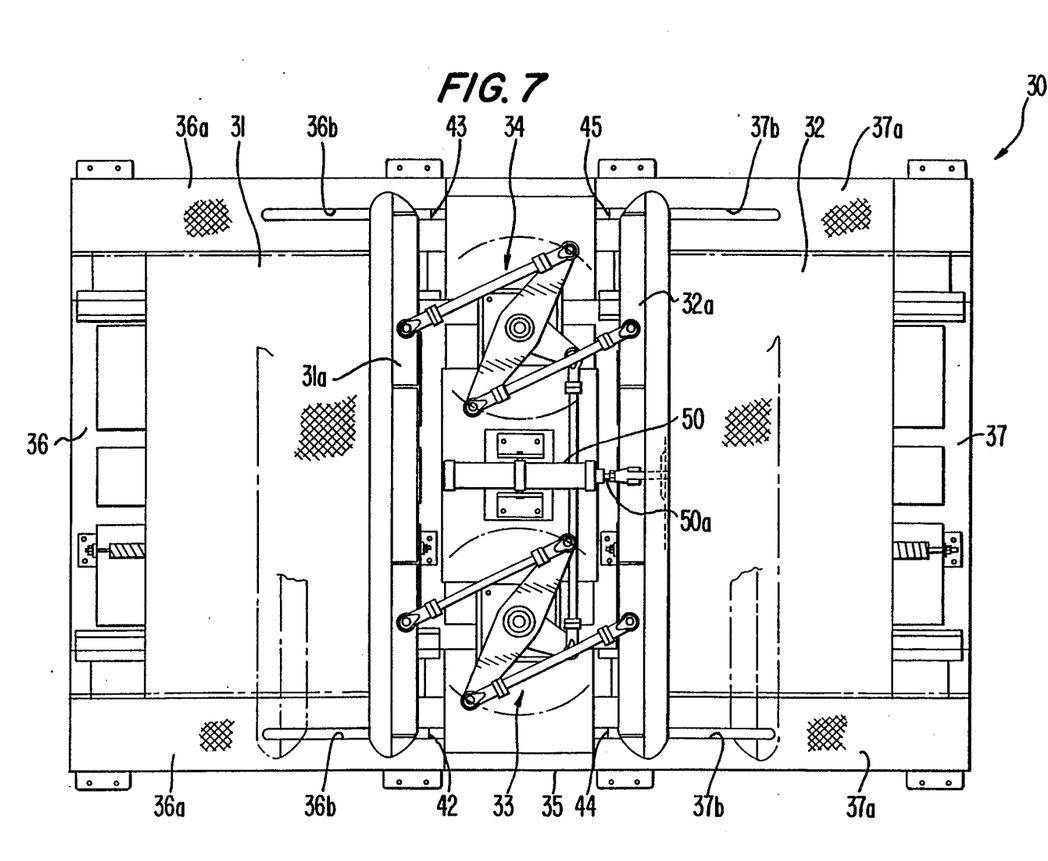
FIG. 7 is a plan view of an equalizer.
Figure 8:
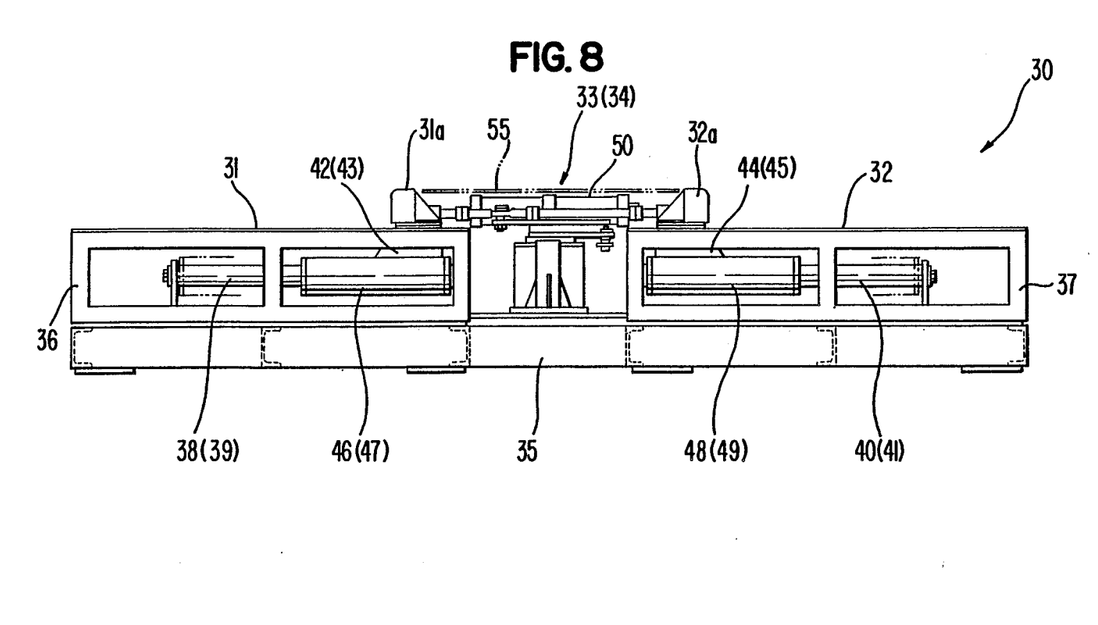
FIG. 8 is a front view of the equalizer of FIG. 7.

Referring to FIG. 7 and FIG. 8, an equalizer 30 which supports rear wheels is explained in detail. A pair of left and right platforms 31 and 32 for placing a left rear wheel and a right rear wheel are mutually connected by a pair of link mechanisms 33 and 34 which include lock mechanisms. The left platform 31 for the left rear wheel is guided and supported slidably on a pair of guide rods 38 and 39, which are disposed parallel in a transverse direction and fixed on a stationarY frame 36. Also, the right platform 32 for the right rear wheel is guided and supported slidably on a pair of guide rods 40 and 41, which are disposed parallel in a transverse direction and fixed on a stationary frame 37. The stationary frames 36 and 37 are fixed on a base frame 35. The platform 31 has an angle frame 31a at its inside end, on which underneath brackets 42 and 43 are fixed at front and rear ends, and the platform 32 has an angle frame 32a at its inside end, underneath which brackets 44 and 45 are fixed at front and rear ends.

The brackets 42 and 43 are inserted into slits 36b provided on an upper element 36a of the stationary frame 36, and are connected to sliders 46 and 47 slidably coupled with the guide rods 38 and 39, respectively. Also, the brackets 44 and 45 are inserted into slits 37b provided on an upper element 37a of the stationary frame 37, and are connected to sliders 48 and 49 slidably coupled with the guide rods 40 and 41, respectively.

The right platform 32 is connected to a piston rod 50a of a power cylinder 50 disposed on the base frame 35 between both link mechanisms 33 and 34, whereby the left platform 31 and right platform 32 can be moved symmetrically in the transverse direction to adjust a mutual distance according to the wheel base of each vehicle. After adjusting the distance, the link mechanisms 33 and 34 are locked by the lock mechanisms.

By turning the steering wheel gradually, while the front wheels are placed on the unlocked turning radius testers 2, the relationship between the steering wheel and front wheels; i.e., the ratio of the steering wheel angle to the turning wheel angle, is detected. On the other hand, during the turning test of the front wheels, further alignment measurements including camber and caster of the front wheels can be done. In FIG. 8, numeral 55 is a cover element.

Before the aiming adjustment of a headlight, in order to calculate the inclination of the vehicle to be tested with respect to the aiming test line in the horizontal plane, both positions of the upper edge 3a of the left headlight 3 and the inside edge 5a of the left combination lamp 5 are detected by the first left TV camera 7, and both positions of the upper edge 4a of the right headlight 4 and the inside edge 6a of the right combination lamp 6 are detected by the first right TV camera 8.

That is, the window of the first left TV camera 7 is set to take whole image of the left combination lamp 5 (see, an area I in FIG. 3), also, the first right TV camera 8 is set in the same way. Image signals detected by the TV cameras 7 and 8 are sent to the image processing unit 9, where the center of the image is determined. One method of detecting the center is by calculating the center of gravity of the image. And next, based on the position of the image center, the window of the first left TV camera 7 is set to take partial images of the upper edge 3a of the left headlight 3 and the inside edge 5a of the left combination lamp 5 (see, areas II in FIG. 3). Also, the first right TV camera 8 is set in the same way. Image signals detected by the TV cameras 7 and 8 are sent to the image processing unit 9, where the upper edges 3a and 4a and inside edges 5a and 6a are recognized as a borderline which discriminates bright areas and dark areas by processing image signals. To make the image of the edges 3a and 4a clear, the headlights 3 and 4, which are turned off, are illuminated by applying lights from below.

Next, referring to FIGS. 2 and 4, the method of the aiming adjustment is explained as follows. At first, information regarding the type of vehicle 1 to be tested is input into the image processing unit 9 through an operating board 51. Positions of the headlights 3 and 4 are detected by the first TV cameras 7 and 8. Then, according to the positions of the headlights 3 and 4, standard coordinates of the headlights 3 and 4; i.e., aiming standard coordinates, are calculated and displayed on the monitors 10 and 11. In this calculation, the aberration or inclination of the vehicle with respect to the aiming testing line in the horizontal plane already calculated and stored is used to correct the aiming standard coordinates to obtain corrected aiming standard coordinates.

Next, the headlights 3 and 4 are turned on, and a second left TV camera 53 and a second right TV camera 54 take images of the lights on the screen 52. The image processing unit 9 detects the brightest point P and a borderline L discriminating a bright area and a dark area which consists of a horizontal line a and an inclined line b. The brightest point P is identified as the center of a brighter area, and the borderline L is identified as an upper borderline where the brightness drastically changes.

The borderline L and the brightest point P or only the borderline L is compared with the corrected aiming standard coordinates, and is judged to determine whether the borderline L remains within a predetermined aiming standard area. Furthermore, the image processing unit 9 calculates a mutual distance D between the brightest point P and a crossing point S of the lines a and b.

When the borderline L is out of the aiming standard area, the image processing unit 9 determines an assumed borderline L based on the mutual distance D and displays it on the monitors 10 and 11. Therefore, workers can perform the aiming adjustment of the headlights 3 and 4 by watching the assumed borderline L coming into the aiming standard area on the monitors 10 and 11.

Figure 4:
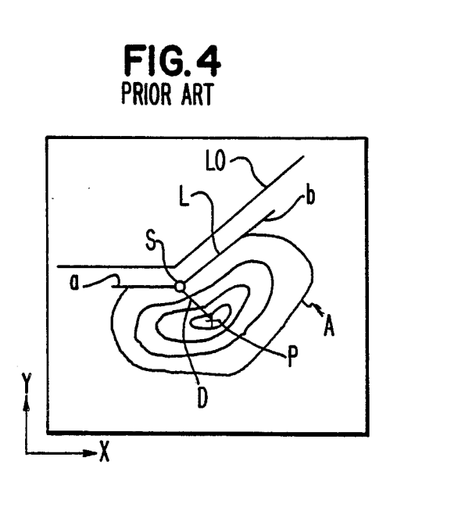
FIG. 4 is a view showing the relationship of a beam distribution pattern of headlight on a screen and aiming standard coordinates.

FIG. 4 shows a beam distribution pattern A for low beams of the headlights 3 and 4. The mutual distance D keeps constant components in an x y dimension even if the direction of headlight beam is changed during the aiming adjustment. The aiming standard area is displayed on the monitors 10 and 11 by a standard borderline Lo, whereby the aiming adjustment is performed so that the borderline L or the assumed borderline L is located lower than the standard borderline Lo.

Figure 1:
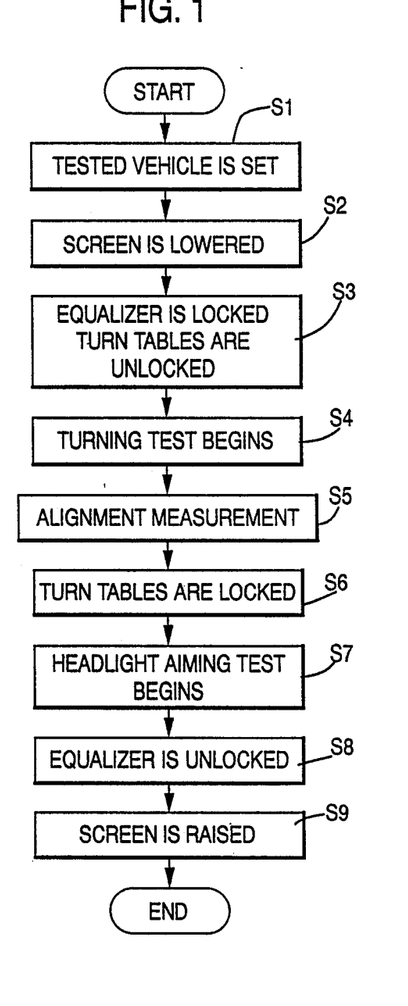
FIG. 1 is an example of a flow chart illustrating the main steps of this invention.

Hereinafter, referring to a flow chart of FIG. 1, main steps to accomplish effectively and accurately the aiming adjustment joined to the wheel turning test on the same test station are explained.

At first, front wheels and rear wheels of the vehicle 1 to be tested are loaded on the turning radius tester 2 and the equalizer 30, which are set to fit the wheel base of each vehicle and set to keep a distance of 3 meters between the screen 52 and the tested vehicle 1 (Step S1). Next, the screen 52 is lowered and located at a predetermined position (Step S2). The equalizer 30 is locked, and the turning tables 15 and 16 are kept in an unlocked condition (Step S3). Then, the turning test begins (Step S4). Meanwhile, measurements of alignment including camber and caster during steering are done by an alignment gauge (Step S5). After finishing the turning test, the turning tables 15 and 16 are locked (Step S6). And next, the aiming test of the headlight begins (Step S7). After finishing the aiming test, the equalizer 30 is unlocked (Step S8). Then, the screen 52 is raised (Step S9).

Figure 9:
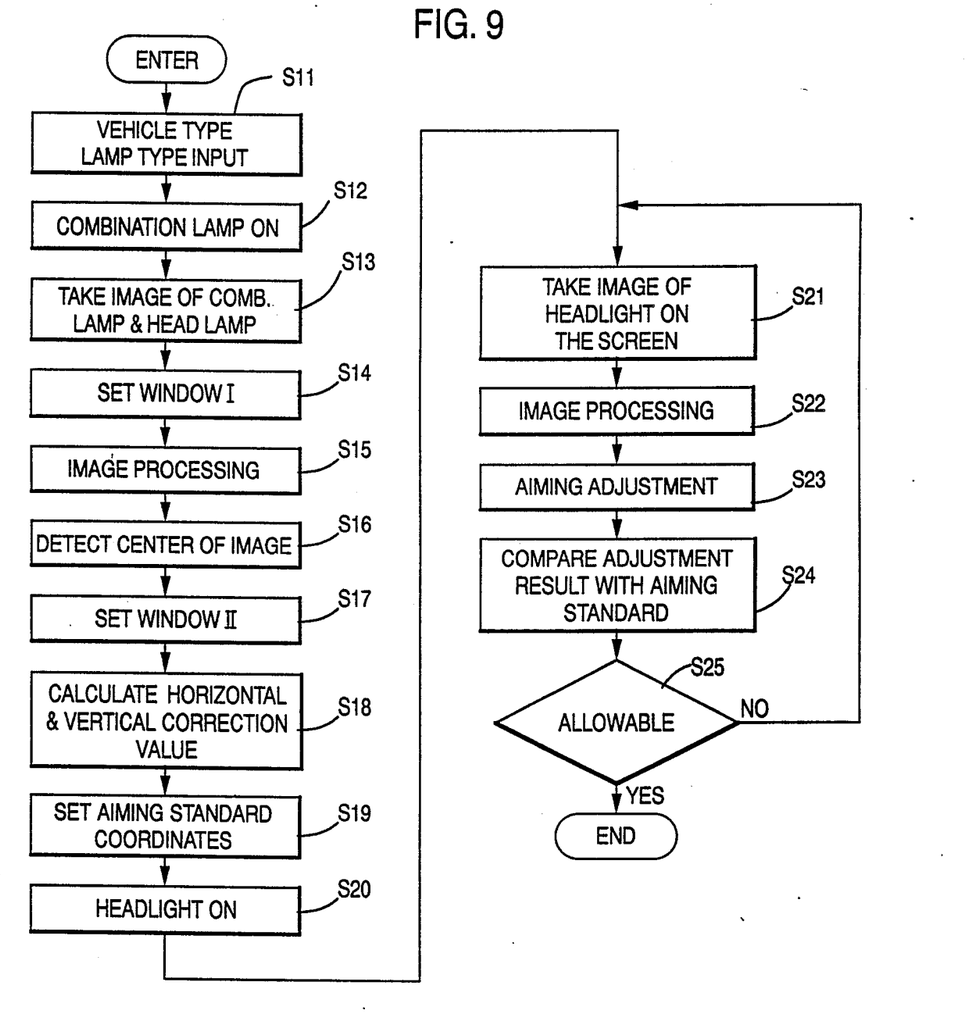
FIG. 9 is an example of a detail flow chart illustrating an aiming adjustment in accordance with this invention.

The detail of the aiming adjustment is explained hereinafter referring to FIG. 9. First, information including vehicle type and tag code of the headlights 3 and 4 which identify type of headlight is input into the image processing unit 9 through the operating board 51 and is displayed on the monitors 10 and 11 (Step S11). The combination lamps 5 and 6 are turned on (Step S12). The first TV cameras 7 and 8 take images of the combination lamps 5 and 6 (Step S13) and set the window I (Step S14). Next, the image processing unit 9 performs image processing (Step S15), and the position of center of the image is detected (Step S16). Based on the position of the center of the image, the first TV cameras 7 and 8 further set the window II (Step S17), where the upper edges 3a and 4a of the headlights 3 and 4 and the inside edges 5a and 6a of the combination lamps 5 and 6 are detected. Based on the detected values, the aberration or inclination of the tested vehicle with respect to the aiming test line in the horizontal plane and vertical plane is calculated and stored (Step S18).

Then, the aiming standard coordinates are set as a result of correction by using the horizontal and vertical correction values, i.e., the aberration or inclination calculated in Step S18 (Step 19). After that, the headlights 3 and 4 are turned on (Step S20), and the second TV cameras 53 and 54 take images of the headlights on the screen 52 (Step 21). The image processing unit 9 then performs image processing and displays the brightest point P and the borderline L on the monitor 10 (Step S22). Watching the monitor 10, workers adjust the aiming of the headlights manually (Step S23), and compare this adjustment result with the aiming standard (Step S24). When the result is allowable, the aiming adjustment ends. If the result is not allowable, steps S21 through S25 are repeated until the result becomes allowable.

Figure 10:
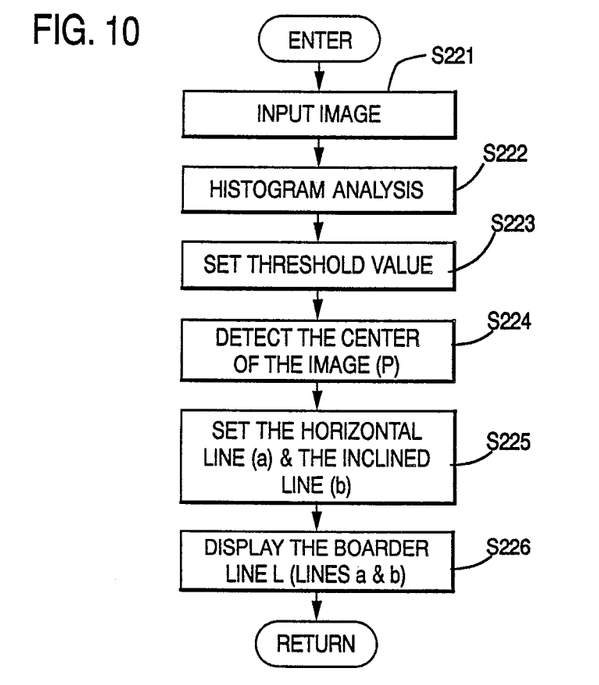
FIG. 10 is an example of a detail flow chart illustrating an image processing procedure on the headlight.
Figure 11:
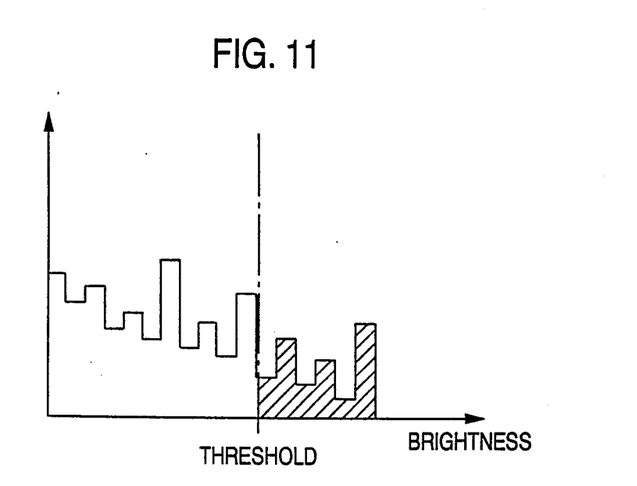
FIG. 11 is a graph showing a hystogram analysis of a headlight image.

In FIG. 10, the image processing step S22 is explained in more detail. At first, image signals sent from the second TV cameras 53 and 54 are processed by A/D converter and are divided into small segments (for example 256 by 256) for analysis by hystogram (Steps S221 and S222). Then, setting a threshold, the brighter area is obtained (Step S223). By geometrically calculating the center of the gravity of the brighter area, the brightest point P is obtained (Step S224).

To obtain the borderline L, differential calculation of the image signals is utilized. According to this result, the horizontal line a and the inclined line b are set and displayed on the monitors 10 and 11 (Steps S225 and S226).

Figure 12:
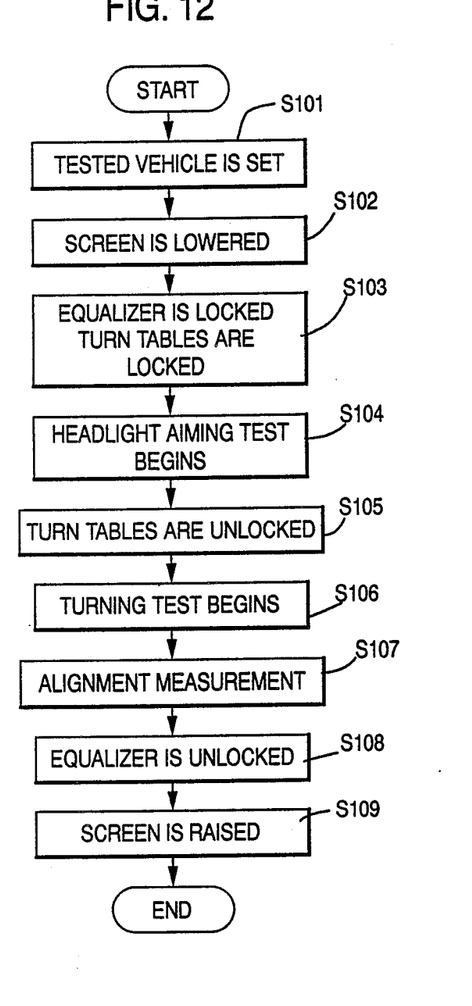
FIG. 12 is another example of a flow chart illustrating the main steps of this invention.

Though this example is explained as above, the aiming adjustment steps can be done before the wheel turning test. As shown in FIG. 12, at first the vehicle to be tested is set (Step S101). Screen 52 is lowered (Step S102). Equalizer 30 is locked and turn tables 15 and 16 are locked (Step S103). Then, the headlight aiming test begins (Step S104). After finishing aiming test, the turn tables 15 and 16 are unlocked (Step S105). The turning test begins (Step S106). Meanwhile, alignment measurement is proceeding (Step S107). After finishing the turning test, equalizer 30 is unlocked (Step S108), and the screen 52 is raised (Step S109).

As described above, this invention enables workers to perform the aiming adjustment efficiently and accurately by detecting the aberration or inclination of the tested vehicle after turning test (Step S4 through Step S6) and calculating the aiming standard coordinates according to the detected aberration or inclination (Steps S18 and S19).

What is claimed is:

1. A method for performing aiming adjustments for headlights of an automotive vehicle to be tested while the automotive vehicle is on a turning test station at which turning tests are performed to obtain a relationship between steering wheel angles and wheel turning angles, comprising:

obtaining a relationship between steering wheel angles and wheel turning angles during the turning tests of the wheels on the turning test station;

detecting a side edge of a headlight or a front combination lamp while the automotive vehicle is on the turning test station;

calculating an aberration or inclination of the automotive vehicle with respect to a headlight aiming testing line in a horizontal plane;

correcting coordinates of the aiming test according to said aberration or inclination;

adjusting the aiming of the headlight or lamp; and, performing said detecting step, said calculating step, said correcting step and said adjusting step while the tested automotive vehicle remains on the tuning test station.

2. A method for determining aiming adjustments in accordance with claim 1 which further comprises:

unlocking locking mechanism of the turning table during the turning test; and a looking step for locking the locking mechanism during the aiming adjustment.

3. A method for determining aiming adjustments in accordance with claim 1 wherein said side edge is detected by a TV camera.

4. A method for determining aiming adjustments in accordance with claim 1 wherein at least one of the headlights and the front combination lamp is turned on.

5. A method for determining aiming adjustments in accordance with claim 1 which further comprises:

calculating an aberration or inclination of the automotive vehicle with respect to a headlight aiming test line in a vertical plane.

6. A method of performing aiming adjustments for headlight of an automotive vehicle while the automotive vehicle is on a turning test station at which a turning test is performed to obtain a relationship between steering wheel angles and wheel turning angles, comprising:

loading wheels of the automotive vehicle on a turning table on the turning test station;

unlocking a locking means of the turning test station so that the turning table on which the wheels are loaded can be rotatable;

obtaining a relationship between steering wheel angels and wheel turning angles during the turning test of the wheels on the turning test station;

locking the locking means of the turning test station;

detecting a side edge of a headlight or a front combination lamp while the automotive vehicle is on the turning test station;

calculating an aberration or inclination of the automotive vehicle with respect to a headlight aiming testing line in a horizontal plane;

correcting coordinates of the aiming test according to said aberration or inclination; and,     adjusting the aiming of the headlight while the automotive tested vehicle remains on the turning test station after the turning test is finished.

7. A method for determining aiming adjustments in accordance with claim 6 which further comprises:

measuring an alignment including camber and caster of the wheel during steering in the turning test.

8. A method of performing aiming adjustments for headlights of an automotive vehicle while the automotive vehicle is on a turning test station at which turning tests are performed to obtain a relationship between steering wheel angles and wheel turning angles, comprising:

loading wheels of the automotive vehicle on the turning test station;

locking a locking means of the turning test station so that a turning table on which the wheels are loaded cannot be rotated;

detecting a side edge of a headlight or a front combination lamp while the tested automotive vehicle is placed on the turning test station;

calculating an aberration or inclination of the tested automotive vehicle with respect to a headlight aiming testing line in a horizontal plane;

correcting coordinates of the aiming test according to said aberration or inclination;

adjusting the aiming of the headlight while the tested automotive vehicle remains on the turning test station before the turning test begins;

unlocking the locking means of the turning test station; and     obtaining a relationship between steering wheel angles and wheel turning angles during the turning test of the wheels on the turning testing station.

9. A method for determining aiming adjustments in accordance with claim 8 which further comprises:

measuring an alignment including camber and caster of the wheel during steering in the turning test.

* * * * *